March 31, 1970 W. GANTER ET AL 3,503,202

TUNING FORK DEVICES

Original Filed June 7, 1966

INVENTORS

Wolfgang Ganter

Friedrich Assmus

BY

Watson, Cole, Grindle & Watson

Attys.

United States Patent Office 3,503,202
Patented Mar. 31, 1970

3,503,202
TUNING FORK DEVICES
Wolfgang Ganter, Schramberg-Sulgen, and Friedrich Assmus, Schramberg-Wurttemberg, Germany, assignors to Messrs. Gebruder Jughans Gesellschaft mit beschrankter Haftung, Schramberg-Wurttemberg, Germany, a corporation of Germany
Original application June 7, 1966, Ser. No. 555,766. Divided and this application Apr. 15, 1969, Ser. No. 816,267
Claims priority, application Germany, June 8, 1965, J 28,304
Int. Cl. G04c *3/02*
U.S. Cl. 58—23 4 Claims

ABSTRACT OF THE DISCLOSURE

A tuning fork maintained in vibration by electromagnetic means and particularly adapted for timekeeping devices having a permanent magnet as a part of a closed magnetic path and arranged on one prong of the tuning fork with a coil on the other prong and with the coil consisting of a control coil and a driving coil coaxially arranged and acted upon directly by the permanent magnet arrangement.

Figure 1:
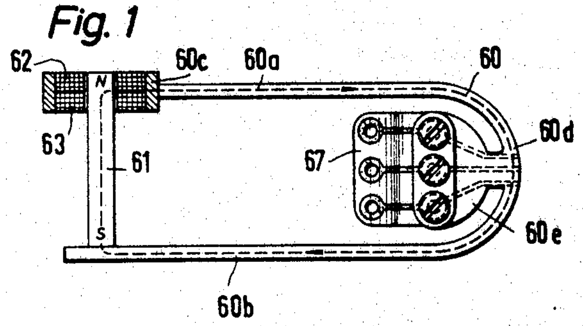

This application is a division of applicant's co-pending application, Ser. No. 555,766, filed June 7, 1966.

The invention relates to a tuning fork held in vibration by electromagnetic means, especially as a movement regulating oscillator for time keeping devices. The tuning fork has a permanent magnet arrangement arranged on at least one prong of the tuning fork with a largely closed magnetic path and with a coil arrangement provided likewise on at least one prong of a tuning fork. The arrangement consists preferably of a control and of an operating coil, which are located in the input circuit or the output circuit of an electronic amplifier circuit.

An electric watch or clock has been known with a self-excited tuning fork kept in vibration in its natural frequency by electromagnetic driving systems, where permanent magnets are arranged at the ends of the prongs which cooperate with two immovably arranged coils as a regulator coil and an operating coil, in the input or output circuit of a transistor amplifier. In this case one of the magnets produces a voltage regulating the transistor in the control coil, while driving impulses act on the other magnet. Therefore, uneven forces act in this case on the prongs of the tuning fork, as a result of which the isochronism is disturbed. Furthermore, a tuning fork held in vibration in an electromagnetic manner has been known for the production of an AC voltage with constant frequency, where the coils located in the input and output circuit respectively of an electronic amplifier circuit as well as a permanent magnet system cooperating with the coils, have been attached to the prongs of the tuning fork. In that case every coil is provided with a soft iron core, opposite which a permanent bar magnet has been arranged at the other prong of the tuning fork. In the case of this arrangement, it is true that equal forces act upon the prongs of the tuning fork but the magnetic application on the coils is unfavorable and strong magnetic forces of an attraction of varying magnitude will result which will disturb the isochronism behavior of the tuning fork.

This invention is based on the object of creating a tuning fork of the initially mentioned type, where equal forces act on the prongs and magnetic forces of attraction, which are undesirable and which disturb the isochronism, will be avoided. According to the invention, this will be achieved by the fact, that the coil arrangement consists of two coaxially arranged coreless coils which are acted upon directly by the permanent magnet arrangement. In this case, the coil arrangement will effectively be arranged on one end of the prongs in such a manner, that the common middle axis of the coils will lie in the plane of vibration or polarization or in parallel thereto whereby the permanent magnet arrangement consists of a bar magnet which is to dip into the coil arrangement with its free pole and which is attached to the other end of the prong. Preferably the tuning fork consists of ferromagnetic material and it constitutes a return for the permanent magnet arrangement. The tuning fork according to this invention can be produced simply, having relatively small dimensions and operating with a good degree of effectiveness.

Figure 2:
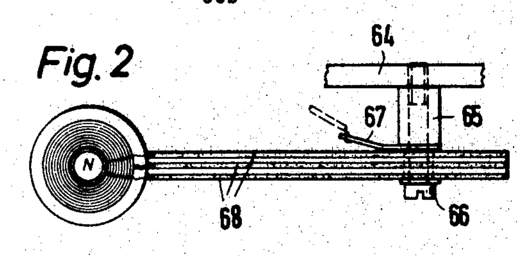

Further objects will be apparent from the following description when considered in connection with the accompanying drawing in which:

FIG. 1 is a top view showing a tuning fork in accordance with the invention, and FIG. 2 is a side view of the tuning fork according to FIG. 1.

The tuning fork has been designated generally by 60 and **60*a* and 60*b* are its two prongs. The bridge part 60*d* of the tuning fork has been attached to a base plate 64 by means of a part 60*e* connected with said bridge part, by means of the screw 66 and insertion of a distance piece 65. The prong 60*a* carries a holder 60*c* for the coil arrangement consisting of the co-axially arranged coils 62 and 63, which coil arrangement has a central opening. A pole 61 of a permanent bar magnet projects into said opening at one end and is attached to the prong 60*b*** with its other end.

The coils 62 and 63 are located in the input circuit or in the output circuit of an electronic amplifier circuit, not shown, especially of a semiconductor amplifier circuit. The feed lines 68 for the coils 62 and 63 run across the prong **60*a* of the tuning fork to the bridge element 60*d* and from here to a connecting plate 67**.

We claim:

1. Tuning fork maintained in vibration by an electromagnetic means, especially for a movement regulating oscillator for time keeping devices comprising a permanent magnet arrangment having a largely closed magnetic path and arranged on at least one prong of the tuning fork, a coil arrangement likewise arranged at least on one prong of the tuning fork, said coil arrangement consisting of a control coil and a driving coil located in an input circuit and in an output circuit respectively of an electronic amplifier circuit, and the coil arrangement consisting of two coaxially arranged, coreless coils acted upon directly by the permanent magnet arrangement.

2. Tuning fork according to claim 1, in which the coil arrangement is provided at one end of a prong of the tuning fork so that a common middle axis of the coils lies in the plane of vibration and in which the permanent magnet arrangement consists of a bar magnet dipping into the coil arrangement with a free pole and attached at an end of the other prong.

3. Tuning fork according to claim 1 in which the parts of the fork consist of ferromagnetic material and in that it forms a return for the permanent magnet arrangement.

4. Tuning fork according to claim 1, in which the coil arrangement is provided at one end of a prong of the tuning fork so that a common middle axis of the coils lies in the plane of vibration parallel thereto.

References Cited

UNITED STATES PATENTS

| | | | |
|---|---|---|---|
| Re. 26,322 | 12/1967 | Bennet et al. | 58—23 |
| 2,928,308 | 3/1960 | Godbey | 84—409 |

RICHARD B. WILKINSON, Primary Examiner

EDITH C. SIMMONS, Assistant Examiner

U.S. Cl. X.R.

84—457; 310—25